US011935715B2

(12) United States Patent
LAng et al.

(10) Patent No.: US 11,935,715 B2
(45) Date of Patent: Mar. 19, 2024

(54) ELECTROMAGNETIC DRIVE UNIT FOR A SWITCHING DEVICE AND SWITCHING DEVICE

(71) Applicant: Eaton Intelligent Power Limited, Dublin (IE)

(72) Inventors: Volker LAng, Bonn (DE); Lutz Friedrichsen, Langerwehe (DE); Julia Otte, Cologne (DE); Christoph Bausch, Bonn (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 365 days.

(21) Appl. No.: 17/413,974

(22) PCT Filed: Dec. 16, 2019

(86) PCT No.: PCT/EP2019/085248
§ 371 (c)(1),
(2) Date: Jun. 15, 2021

(87) PCT Pub. No.: WO2020/126977
PCT Pub. Date: Jun. 25, 2020

(65) Prior Publication Data
US 2022/0044898 A1 Feb. 10, 2022

(30) Foreign Application Priority Data
Dec. 18, 2018 (GB) ..................................... 1820593

(51) Int. Cl.
*H01H 47/00* (2006.01)
*H01H 50/16* (2006.01)
(Continued)

(52) U.S. Cl.
CPC .......... *H01H 50/44* (2013.01); *H01H 50/163* (2013.01); *H01H 50/20* (2013.01); *H01H 50/546* (2013.01)

(58) Field of Classification Search
None
See application file for complete search history.

(56) References Cited

U.S. PATENT DOCUMENTS 6,703,575 B1 3/2004 Yamamoto
2020/0258708 A1* 8/2020 Belisle .................. H01H 50/20

FOREIGN PATENT DOCUMENTS

CN 2503599 Y 7/2002
EP 2590192 A1 5/2013
(Continued)

*Primary Examiner* — Stephen W Jackson
(74) *Attorney, Agent, or Firm* — LEYDIG & VOIT, MAYER, LTD.

(57) ABSTRACT

An electromagnetic drive unit for a switching device includes: a magnetic core with a first, a second, and a third magnetic path each arranged transversely with respect to a longitudinal axis of the electromagnetic drive unit and coupled to longitudinal magnetic struts at respective ends to form a magnetic frame structure; an armature movable along the longitudinal axis between a first and a second state; and a first and a second magnetic coil for moving the armature based on excitation of the first and/or the second magnetic coil. The first magnetic coil is arranged between the first and the second magnetic path and the second magnetic coil is arranged between the second and the third magnetic path with respect to the longitudinal axis. The magnetic core and the magnetic coils are arranged such that a magnetic flux that flows through the magnetic paths to move the armature is adjustable.

15 Claims, 6 Drawing Sheets

(51) Int. Cl.

| | |
|---|---|
| ***H01H 50/20*** | (2006.01) |
| ***H01H 50/44*** | (2006.01) |
| ***H01H 50/54*** | (2006.01) |

(56) References Cited

FOREIGN PATENT DOCUMENTS

| | | | |
|---|---|---|---|
| EP | 3116014 | A1 | 1/2017 |
| FR | 1039265 | A | 10/1953 |
| FR | 2951862 | A1 | 4/2011 |
| FR | 2952131 | A1 | 5/2011 |
| JP | 2005166606 | A | 6/2005 |

* cited by examiner

ELECTROMAGNETIC DRIVE UNIT FOR A SWITCHING DEVICE AND SWITCHING DEVICE

CROSS-REFERENCE TO PRIOR APPLICATIONS

This application is a U.S. National Phase application under 35 U.S.C. § 371 of International Application No. PCT/EP2019/085248, filed on Dec. 16, 2019, and claims benefit to British Patent Application No. GB 1820593.0, filed on Dec. 18, 2018. The International Application was published in English on Jun. 25, 2020 as WO 2020/126977 under PCT Article 21(2).

FIELD

The present disclosure is related to an electromagnetic drive unit for a switching device and a switching device.

BACKGROUND

A switching device or switching arrangement comprises a contact unit or switching portion and an actuating portion to set a switching state of the switching portion. In general it is a challenge to provide a rapid switch off in particular in case of a short circuit.

Document EP 2590192 A1 describes a switch for multi-pole direct-current operation.

The disclosure is related to an electromagnetic drive unit for a switching device and a switching device for switching AC and DC currents. The electromagnetic drive unit for a switching device and the switching device may be used in the field of electric mobility.

SUMMARY

In an embodiment, the present invention provides an electromagnetic drive unit for a switching device, comprising: a magnetic core with a first, a second, and a third magnetic path each arranged transversely with respect to a longitudinal axis of the electromagnetic drive unit and coupled to longitudinal magnetic struts at respective ends to form a magnetic frame structure; an armature configured to be movable along the longitudinal axis between a first and a second state; and a first and a second magnetic coil configured to move the armature based on excitation of the first and/or the second magnetic coil, wherein the first magnetic coil is arranged between the first and the second magnetic path and the second magnetic coil is arranged between the second and the third magnetic path with respect to the longitudinal axis, wherein the magnetic core and the magnetic coils are configured in coordination with each other such that a magnetic flux that flows through the magnetic paths to move the armature between the first and the second state is adjustable, wherein the armature at one end comprises an inclined pole surface with respect to the longitudinal axis which is configured to interact with an inclined magnetic surface of the magnetic core to set the second state of the armature, and wherein a gap having a predetermined width is defined between the inclined pole surface and the inclined magnetic surface between the armature and the magnetic core in the second state of the armature.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1A:
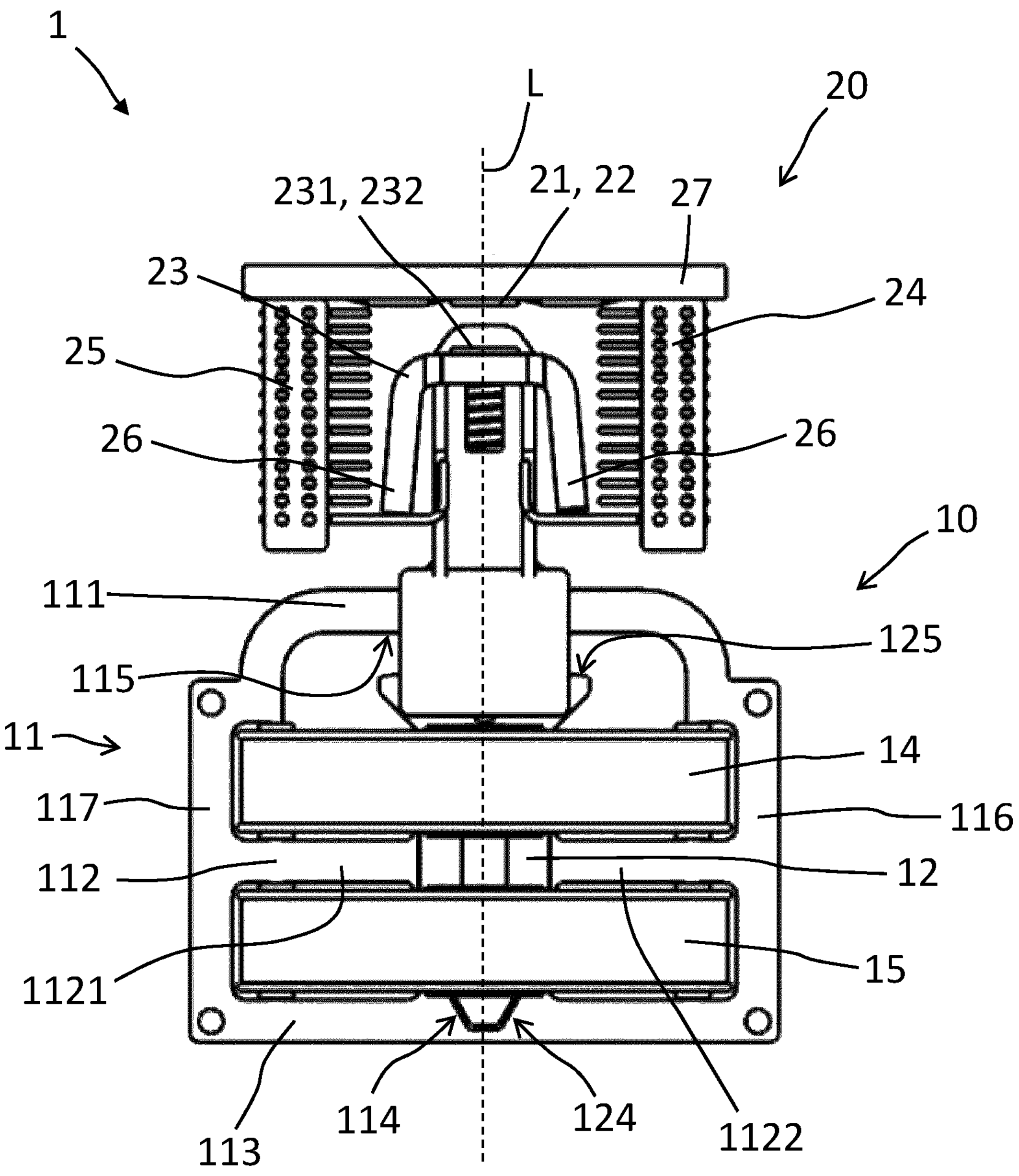
FIG. 1A shows an example of a switching device with an electromagnetic drive unit in the first position.

In an embodiment, the present invention provides an electromagnetic drive unit for a switching device and a switching device that enables rapid switching.

According to an aspect, an electromagnetic drive unit for a switching device comprises a magnetic core with a first, a second and a third magnetic path each arranged transversely with respect to a longitudinal axis of the electromagnetic drive unit and coupled to longitudinal magnetic struts at respective ends to form a magnetic frame structure. The electromagnetic drive unit further comprises an armature configured to be movable along the longitudinal axis between a first and a second state. The electromagnetic drive unit further comprises a first and a second magnetic coil configured to move the armature due to excitation of the first and/or the second magnetic coil, wherein the first magnetic coil is arranged between the first and the second magnetic path and the second magnetic coil is arranged between the second and the third magnetic path with respect to the longitudinal axis and wherein the magnetic core and the magnetic coils are configured in coordination with each other such that a magnetic flux that flows through the magnetic paths to move the armature between the first and the second state is adjustable.

By use of the described electromagnetic drive unit a switching device is feasible at low cost which enables rapidly switching by remote control between a switched-on and a switched-off state of the switching device even without the use of additional permanent magnets. The electromagnetic drive unit realizes an active actuator for rapid switching dynamics and is activated on the one hand to realize the first state of the armature corresponding to a switched-on state of the switching device and is activated on the other hand to realize the second state of the armature corresponding to a switched-off state of the switching device. The armature is configured to be coupled to a contact bridge of the switching device to enable switching between the first state and the second state or a switched-on state and a switched-off state of the switching device, respectively.

Due to the described arrangement of the electromagnetic drive unit a predetermined or default magnetic flux flowing through the first, the second and the third magnetic paths spaced apart from each other can be adjusted to actively control a movement of the armature. Thus, the actuator is also actively controlled to set the switched-off state of a corresponding switching device. Therefore, de-excitation of a holding circuit and a movement in a switching-off direction can be performed very fast. A use of additional permanent magnets associated to the holding circuit is not required and contributes to a simple and clear configuration of the electromagnetic drive unit.

Excitation of the respective magnetic coils results from applying power or voltage to it and may also be named magnetization of the respective coil. Thus, de-excitation may also be named de-magnetization and may result from removing power or voltage from the magnetic coil or coils.

According to an embodiment, the first magnetic coil is configured to face a contact unit with respect to an assembled configuration of the switching device and to move the armature into the first state due to excitation. Further, the magnetic paths are configured such that the second magnetic path is arranged between the first and the third magnetic path with respect to the longitudinal axis. Thus, the first magnetic path is configured to face towards the contact unit and the third magnetic path is configured to face away from the contact unit with respect to an assembled configuration of the switching device. The magnetic paths and the first magnetic coil are configured in coordination with each other such that due to excitation of the first magnetic coil the magnetic flux substantially flows through the first and the second magnetic path, and a magnetic force acts in direction from the second magnetic path to the first magnetic path.

The described configuration of the electromagnetic drive unit enables a control of the magnetic flux generated by the first and/or the second magnetic coil. The first magnetic coil provides a pulling force to move the armature into the first state, for example against an acting spring force. The first and second magnetic path form a holding circuit and the magnetic flux is beneficially controlled such that the magnetic flux flowing through the third magnetic path is as low as possible.

In a further embodiment, the second magnetic coil is configured to face away from the contact unit with respect to an assembled configuration of the switching device and to move the armature into the second state due to excitation, wherein the magnetic paths and the magnetic coils are configured in coordination with each other such that when the first magnetic coil is de-excited and the second magnetic coil is excited the magnetic flux flows through all magnetic paths reducing or removing the holding force and creating a second force opposite the holding force resulting in a magnetic force that acts in direction from the first magnetic path to the second magnetic path to move or hold the armature in the second state.

The second magnetic coil realizes a switch-off coil, in particular to rapidly move the armature into the second state, for example in cooperation with an acting spring force. Furthermore, exciting the second magnetic coil contributes to de-exciting the first magnetic coil. Thus, a fast switching and setting a switched-off state without a use of permanents magnets is enabled. Starting from the first or switched-on state the armature is in contact with the first magnetic path due to a holding magnetic flux. De-excitation or de-magnetization of the first magnetic coil, and excitation or magnetization of the second magnetic coil results in generating a magnet flux in the magnetic paths contrary to the holding magnetic flux. Thus, the armature is forced to move away from the first magnetic path to the third magnetic path and a gap is formed between an end of the armature and the first magnetic path. When the armature contacts the third magnetic path with its opposite end the second or switched-off state is set and a remaining magnetic flux substantially flows through the second and the third magnetic path in interaction with the armature. Thus, at the beginning of the switching off mechanism the magnetic flux is flowing through all magnetic paths. Whereas at the end when the switched-off state is enabled the magnetic flux through the magnetic core is beneficially controlled such that a respective flow through the first magnetic path is low.

The magnetic paths are coupled by longitudinal struts substantially arranged parallel to the longitudinal axis of the electromagnetic drive unit which also presents a longitudinal axis of a corresponding assembled switching device. The first and the third magnetic path crossing the longitudinal axis realize a magnetic frame structure in connection with the longitudinal struts, wherein the second magnetic path defines a middle strut substantially orientated parallel and spaced apart to the first and the third magnetic path.

According to a further embodiment of the electromagnetic drive unit the first magnetic path comprises curved regions that couple the first magnetic path to the longitudinal magnetic struts. Such a formation of the first magnetic path facing the contact unit with respect to an assembled state of the switching device enables beneficial adjustment of the magnetic flux through the magnetic core to move the armature. The magnetic core may further comprise a contour with curved regions, recesses and/or protrusions arranged at the magnetic frame structure to advantageously control the magnetic flux enabling fast switching of the switching device.

In a further embodiment, the armature comprises a flat pole surface at one end and an inclined pole surface at an opposite end with respect to the longitudinal axis. The flat pole surface is configured to interact with a flat magnetic surface of the magnetic core to set the first state of the armature, and the inclined pole surface is configured to interact with an inclined magnetic surface of the magnetic core to set the second state of the armature. The specific design of the pole surfaces of the armature in interaction with corresponding magnetic surfaces of the magnetic core enables advantageous control of the electromagnetic drive unit and functioning of the switching device.

The different formation of the opposite pole surfaces for the corresponding switched-on and switched-off state of the switching device contributes to rapid switching and fast movement as well as reliable and stable maintaining of the respective first and second state of the armature. With respect to the first state or the switched-on state the flat pole and magnetic surfaces enable a strong holding force requiring only a low holding power at the same time. In order to get from the first to the second state, the inclined pole surfaces create a strong magnetic flux resulting in a high pulling force, which in turn results in a faster movement of the armature with a low excitation of the second magnetic coil. Thus, less power is needed for the movement.

According to an embodiment, the armature may comprise flat pole surfaces at both ends interacting with flat surfaces of the magnetic core. Alternatively, the armature may comprise inclined pole surfaces at both ends interacting with inclined surfaces of the magnetic core. An inclined surface may also be named oblique surface.

In an embodiment, the magnetic paths are configured such that the second magnetic path is arranged between the first and the third magnetic path with respect to the longitudinal axis and comprises two separated segments each facing the armature on opposite sides and thereby defining a non-magnetic gap between the respective segment and the armature which has a predetermined width. Preferably the gap has a width larger or equal 0.2 mm. Preferably the gap has a width within a range of 0.2 mm to 0.4 mm. Thus, the second magnetic path extends from opposite sides into an inner space of the magnetic frame structure in direction to the armature. One end of each segment is coupled to a respective magnetic strut and the other free end is arranged closely to the movable armature. Such a configuration beneficially affects the magnetic flux through the magnetic core and the movement of the armature. The non-magnetic gap between the segments and the armature can be achieved by an insulating layer around the armature, at least in the region where it moves alongside the segments. Alternatively the insulating layer may be applied to the surfaces on the segments that face the armature. The insulating material needs to have a permeability $\mu_r$ of 1 or close to 1. It can be for example made of a plastic material.

According to a further embodiment of the electromagnetic drive unit, the armature at one end comprises an inclined pole surface which is configured to interact with an inclined surface of the magnetic core to set the second state of the armature, wherein the inclined pole surface and the inclined magnetic surface facing each other define a non-magnetic gap between the armature and the magnetic core in the second state of the armature. The gap has a predetermined width.

Preferably the gap has a width larger or equal 0.5 mm in the vertical direction. Preferably the gap has a width within a range of 0.5 mm to 1.0 mm in the second state of the armature. For example, the width of the gap may depend also on the angle of the inclined pole surfaces. Such a configuration also beneficially affects the magnetic flux through the magnetic core and the movement of the armature.

It is recognized in the present invention that the geometrical relation of the described gaps, that is a) the gap between the segments of the second magnetic path and the armature, b) the gap between the flat surface of the armature and the magnetic core with respect to the first state of the armature, and c) the gap between the inclined surfaces of the armature and the magnetic core with respect to the second state of the armature, advantageously affects the magnetic flux through the magnetic core and its magnetic paths and the movement and positioning of the armature in its first and second state and thereby enabling fast and reliable switching between a switched-on and a switched-off state of the corresponding switching device.

Due to excitation of the first magnetic coil the armature is moved or held in the first state according a switched-on state of the switching device. If the first magnetic coil is no longer excited but excitation of the second magnetic coil is introduced a rapid de-excitation of the holding circuit is achievable containing the first magnetic path and the first magnetic coil, inter alia. A magnetic force of attraction in direction to a switched-off state can be generated in this way. This force can be in addition to a spring force of a biased spring tending to constantly act in the switched-off state direction. Thus, if there is no excitation both of the first and the second magnetic coil a safe switched-off state of the switched device is maintained.

In an example embodiment, the excitation of the second magnetic coil can be initiated based on a capacitor charged in advanced.

In a further example embodiment, the non-magnetic gap between a respective segment of the second magnetic path and the armature and the non-magnetic gap between the armature and the magnetic core with respect to the first state of the armature are geometrically configured in relation to each other. In particular, a width of the gap between the armature and the magnetic core with respect to the first state of the armature (i.e. the non-magnetic gap between the armature and the first magnetic path) is smaller than a width of the gap between a respective segment of the second magnetic path and the armature.

According to a further embodiment of the electromagnetic drive unit the magnetic core comprises a plurality of metal sheets, each sheet being electrically and magnetically isolated. Such an assembling of the magnetic core enables a low cost electromagnet drive unit and contributes to minimize an appearance of undesirable eddy currents.

The described electromagnetic drive unit may be used to control AC- and DC-switching arrangements configured for switching operational currents and short circuit currents.

According to an embodiment, a switching device comprises an embodiment of the electromagnetic drive unit as described above and a contact unit having a first and a second fixed contact, a contact bridge and a first and a second movable contact that are arranged at the contact bridge. The first fixed contact is in contact to the first movable contact and the second fixed contact is in contact to the second movable contact in a switched-on state of the switching device and the first fixed contact is free of contact to the first movable contact and the second fixed contact is free of contact to the second movable contact in a switched-off state of the switching device. The armature of the electromagnetic drive unit is coupled to the contact bridge to set the switching device in a switched-on state or in a switched-off state due to excitation or de-excitation of the first magnetic coil and a respective movement of the armature along the longitudinal axis. The second magnetic coil will assist in the de-excitation of at least part of the magnetic core and the fist coil.

Such a configuration of a switching device using the described electromagnetic drive unit enables active (that is by providing power to the second coil) de-excitation of the first magnetic path by de-excitation of the first coil and excitation of the second coil results in a short switching off time, for example with a duration of less than 2 ms, and therefore contributes to a safe operation and thus avoids injury or damage.

It is further understood that the described features and characteristics of the electromagnetic drive unit are also disclosed with respect to the switching device and vice versa, if applicable.

In a further embodiment, the switching device comprises a spring configured to bias the contact bridge and/or the armature in a direction to set the switching device in a switched-off state. Such a permanently acting spring force enables a secure setting of the switched-off state even if the magnetic coils are not excited. The spring force further supports the magnetic force initiated by the second magnetic coil due to excitation and thus increases the speed of the switching operation from a switched-on to a switched-off state of the switching device.

According to a further embodiment the switching device comprises a first arc extinguishing device with a first pair of arcing chambers for extinguishing a first arc originating between the first fixed contact and the first movable contact and a second arc extinguishing devices with a second pair of arcing chambers for extinguishing a second arc originating between the second fixed contact and the second movable contact.

In a further embodiment, the switching device comprises a control unit having an output coupled to at least one control input of the electromagnetic drive unit, wherein the control unit is configured to set the switching device in a switched—on state or in a switched-off state depending on a control signal provided by the output of the control unit in order to excite one or both magnetic coils and to control a movement of the armature. For example, the control circuit is configured to set the switching device in the switched-off state depending on an emergency signal received at the control unit. Thus, the control signal may be a command to de-excite or de-magnetize the first magnetic coil by breaking the power supply and to excite or magnetize the second magnetic coil by applying power and thus initiating the rapid switch-off at the same time.

The following description of figures of embodiments may further illustrate and explain aspects of the electromagnetic drive unit for a switching device and the switching device.

Parts, devices and circuits with the same structure and the same effect, respectively, appear with equivalent reference symbols. In so far as parts, devices or circuits correspond to one another in terms of their function in different figures, the description thereof is not repeated for each of the following figures. For the sake of clarity elements might not appear with the corresponding reference symbol in all figures possibly.

FIG. 1A shows an example of a switching device 1. The switching device 1 provides a switching function with a contact unit 20 and a drive function with an electromagnetic drive unit 10. In the following the breaker function is explained. The contact unit 20 comprises a first and a second fixed contact 21, 22, a first and a second movable contact 231, 232 and a contact bridge 23. The contact bridge 23 may be named switching bridge. The first and the second movable contacts 231, 232 are fixed on the contact bridge 23.

Figure 2A:
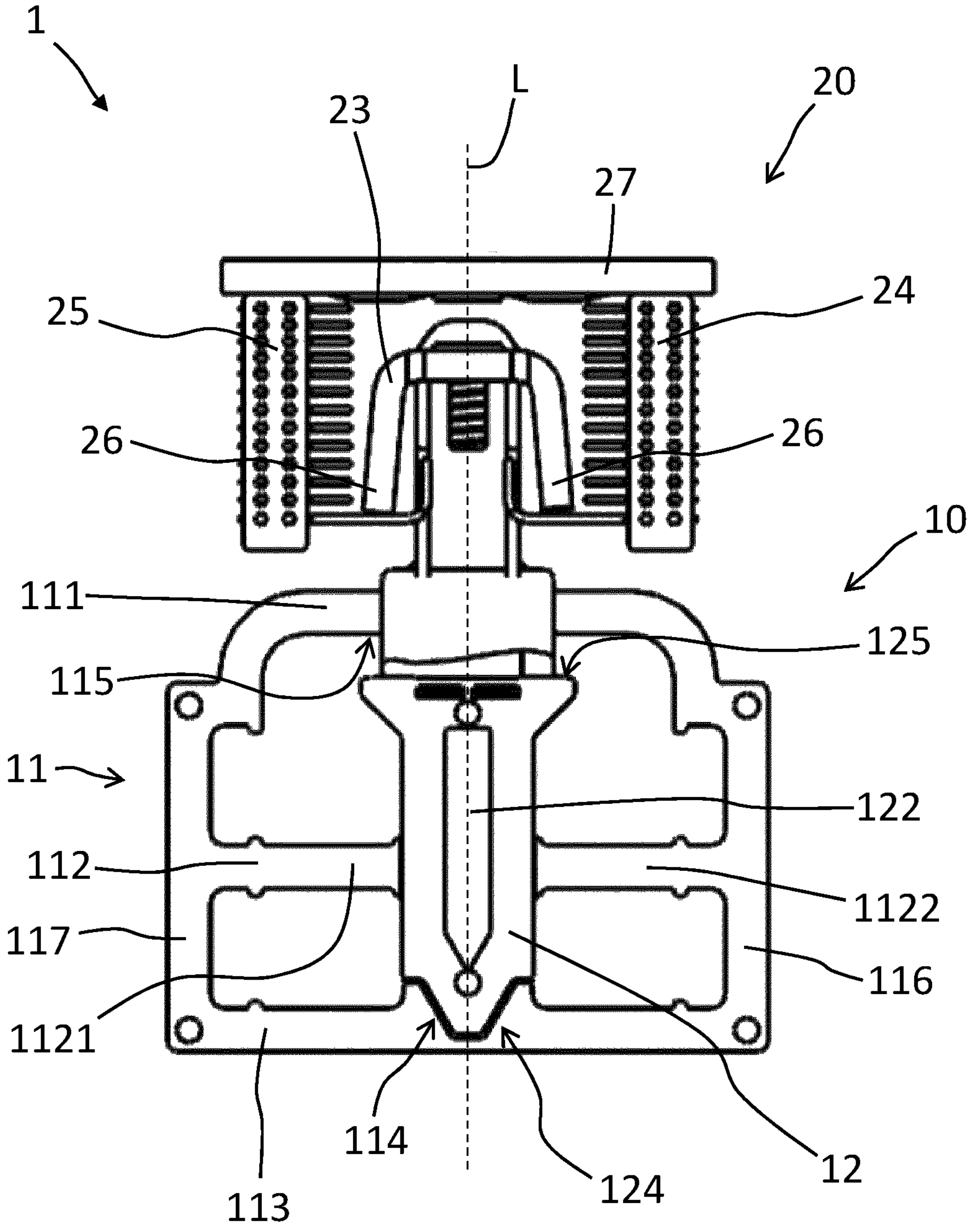
FIG. 2A shows the switching device with the electromagnetic drive unit in the first position and the coils removed.

As shown in FIG. 1A and FIG. 2A, the first fixed contact 21 is free of contact to the first movable contact 231 and the second fixed contact 22 is free of contact to the second movable contact 232 in a second, switched-off state of the switching device 1.

Figure 1B:
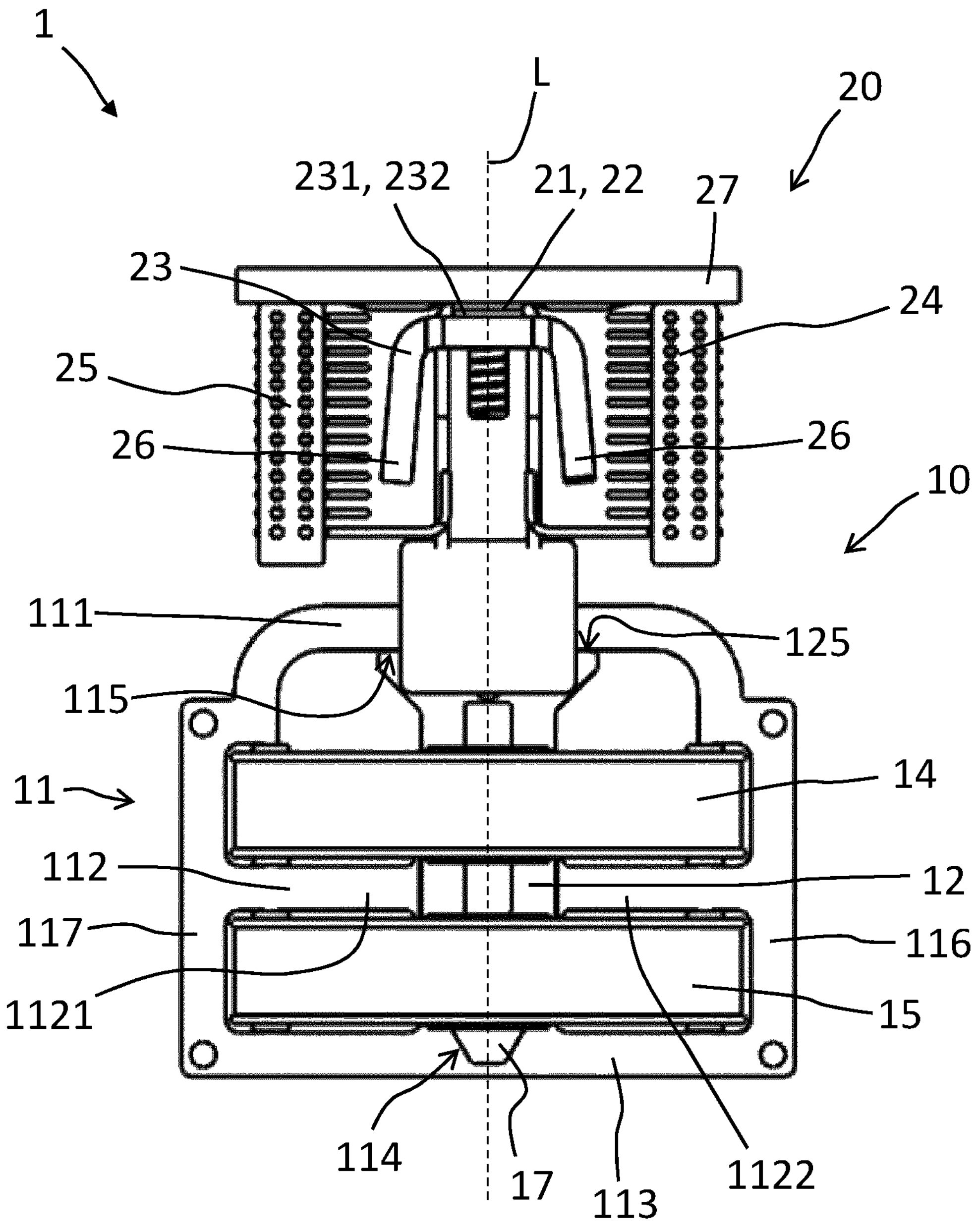
FIG. 1B shows the switching device with the electromagnetic drive unit in the second position.
Figure 2B:
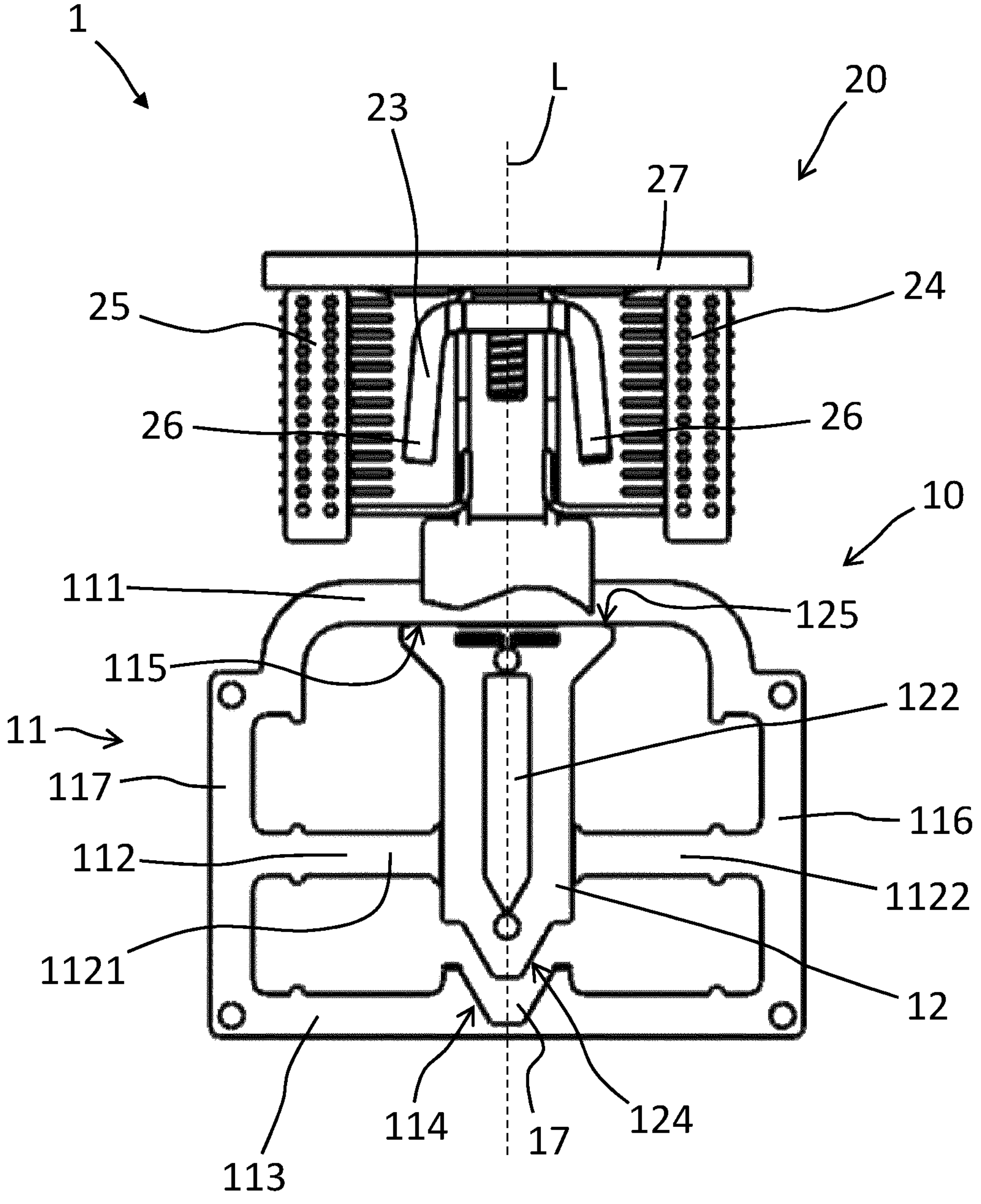
FIG. 2B shows the switching device with the electromagnetic drive unit in the second position and the coils removed.

FIGS. 1B and 2B show the first fixed contact 21 in contact to the first movable contact 231 and the second fixed contact 22 in contact to the second movable contact 232 in a first, switched-on state of the switching device 1.

The contact bridge 23 is coupled to an armature 12 of the electromagnetic drive unit 10 to set the switching device 1 in the first or switched-on state or in the second or switched-off state due to excitation of magnetic coils 14, 15 and movement of the armature 12 along a longitudinal axis L of the switching device 1.

Thus, the armature 12 is configured to be movable along the longitudinal axis L between a first state corresponding to a switched-on state of the switching device (see FIGS. 1B and 2B) and a second state corresponding to a switched-off state of the switching device (see FIGS. 1A and 2A).

FIG. 1A shows a schematic view of the switching device 1 in a switched-off state comprising an electromagnetic drive unit (10) with the two magnetic coils 14 and 15. FIG. 1B shows a schematic view of the switching device 1 in a switched-on state in illustration with the two magnetic coils 14 and 15.

Coils 14 and 15 are removed from corresponding views in FIGS. 2A and 2B in order to show a possible embodiment of the magnetic frame structure of the magnetic core 11 and its magnetic paths 111, 112, 113.

The contact unit 20 further comprises a first arc extinguishing device 24 for extinguishing a first arc originating between the first fixed contact 21 and the first movable contact 231 and a second arc extinguishing device 25 for extinguishing a second arc originating between the second fixed contact 22 and the second movable contact 232. The switching device 1 may comprise an arc guiding device 27 which might comprise a permanent magnetic system and one or 5 more arc guiding elements 26 which are coupled to the contact bridge 23 and which are configured to guide an originated arc to a respective arc extinguishing device 24, 25.

The electromagnetic drive unit 10 comprises a magnetic core 11 typically made from a ferromagnetic material with a first, a second and a third magnetic path 111, 112, 113 each arranged transversely with respect to the longitudinal axis L and coupled to longitudinal magnetic struts 116, 117 at respective ends to form a magnetic frame structure. The electromagnetic drive unit 10 further comprises a first and a second magnetic coil 14, 15 configured to move the armature 12 due to excitation of the first and/or the second magnetic coil 14, 15, wherein the first magnetic coil 14 is arranged between the first and the second magnetic paths 111, 112 and the second magnetic coil 15 is arranged between the second and the third magnetic paths 112, 113 with respect to the longitudinal axis L. The magnetic core 11 and the magnetic coils 14, 15 are configured in coordination with each other such that a predetermined magnetic flux that flows through the magnetic paths 111, 112, 113 to move the armature 12 between the first and the second state is adjustable.

The first magnetic path 111 faces the contact unit 20 whereas the third magnetic path 113 faces away from the contact unit 20. Thus, the second magnetic path 112 realizes a middle web extending into an inner space of the magnetic frame structure. The first magnetic path 111 may comprise curved portions at its ends which are coupled to the respective magnetic struts 116 and 117. With respect to the illustrated embodiment the magnetic paths 111, 112, 113 are configured substantially perpendicular and the magnetic struts 116, 117 are configured substantially parallel with respect to the longitudinal axis L. In comparison, the magnetic paths 111, 112, 113 are configured parallel among each other.

The armature 12 comprises a flat pole surface 125 at one end facing the contact unit 20 and an inclined pole surface 124 at an opposite end facing away from the contact unit 20. The flat pole surface 125 is configured to interact with a flat magnetic surface 115 of the magnetic core 11 arranged at the first magnetic path 111 when in the first state of the armature 12. The inclined pole surface 124 is configured to interact with an inclined magnetic surface 114 of the magnetic core 11 formed as a recess at the third magnetic path 113 when in the second state of the armature 12. The specific design of the pole surfaces 124 and 125 of the armature 12 in interaction with corresponding magnetic surfaces 114 and 115 of the magnetic core 11 enables advantageous control of the electromagnetic drive unit 10 and operation of the switching device 1.

With respect to the first state or the switched-on state respectively the flat pole surface 125 and the flat magnetic surface 115 enable a strong holding force requiring only a low holding power. In order to get from the first to the second state, the inclined pole surfaces 124 create a strong magnetic flux resulting in a high pulling force, which in turn results in a faster movement of the armature 12 with a low excitation of the second magnetic coil 15. Thus, less power is needed for the movement.

Further, the second magnetic path 112 comprises at least two separated segments 1121 and 1122 each facing the armature 12 on opposite sides and thereby defining a gap 1123 between the respective segment 1121, 1122 and the armature 12. Such a gap 1123 has a predetermined width, preferably within a range of 0.2 mm to 0.4 mm. Such a segmented second magnetic path 112 with free ends facing the movable armature 12 beneficially affects the magnetic flux through the magnetic core 11 and the movement of the armature 12 as well as a rapid switching of the switching device 1.

The inclined pole surface 124 and the inclined magnetic surface 114 facing each other define a further gap 17 between the armature 12 and the third magnetic path 113 of the magnetic core 11 in the second state of the armature 12 which has a predetermined width (s. FIGS. 1A and 2A). The gap 17 may have a width of more than 0.5 mm, preferably within a range of 0.5 mm to 1.0 mm in the second state of the armature 12. Such a configuration also beneficially affects the magnetic flux through the magnetic core 11 and the movement of the armature 12.

Gaps between the poles 124, 125 and the magnetic paths 111, 113 are realized for example as air gaps, or from any magnetically indifferent material having a relative permeability μr of 1 or close to 1. In order to maintain the gaps in the first and second state, spacers 18 (see also FIGS. 3 and 4) may be used of a required thickness, and also be made of a material with a relative permeability μr of 1 or close to 1.

A spacer made from non-magnetic material may also be used for gap (or gaps) 1123 in order to keep the gap(s) at a pre-defined or minimum distance.

The gaps will therefore be called non-magnetic gaps.

Due to excitation of the first magnetic coil 14 the armature 12 is moved or held in the first (switched-on) state of the switching device 1. In particular a geometrical coordination of the described gaps 1123 and 17, that is the gap 1123 between the segments 1121, 1122 of the second magnetic path 112 and the armature 12 and the gap 17 between the inclined surfaces 114, 124 of the armature 12 and the third path 113 of the magnetic core 11 with respect to the second state of the armature 12, advantageously affects the magnetic flux through the magnetic core 11 and its magnetic paths 111, 112, 113. As the gap 17 is larger than the gap 1123 the main magnetic flux is led through the second magnetic path 112. Thus, only a small part of the magnetic flux is led through the third magnetic path 113, resulting in a low holding force between the third magnetic path 113 and the armature 12, and at the same time a high pulling force between the first magnetic path 111 and the armature 12. This enables reliable switching between a switched-off and a switched-on state of the switching device 1.

The first magnetic coil 14 and the first and second magnetic paths 111, 112 form a holding circuit enabling secure and reliable maintenance of the position of the armature 12 in the first state using low holding power but enabling a comparatively strong holding force due to the flat pole surface 125 and the flat magnetic surface 115.

Figure 4:
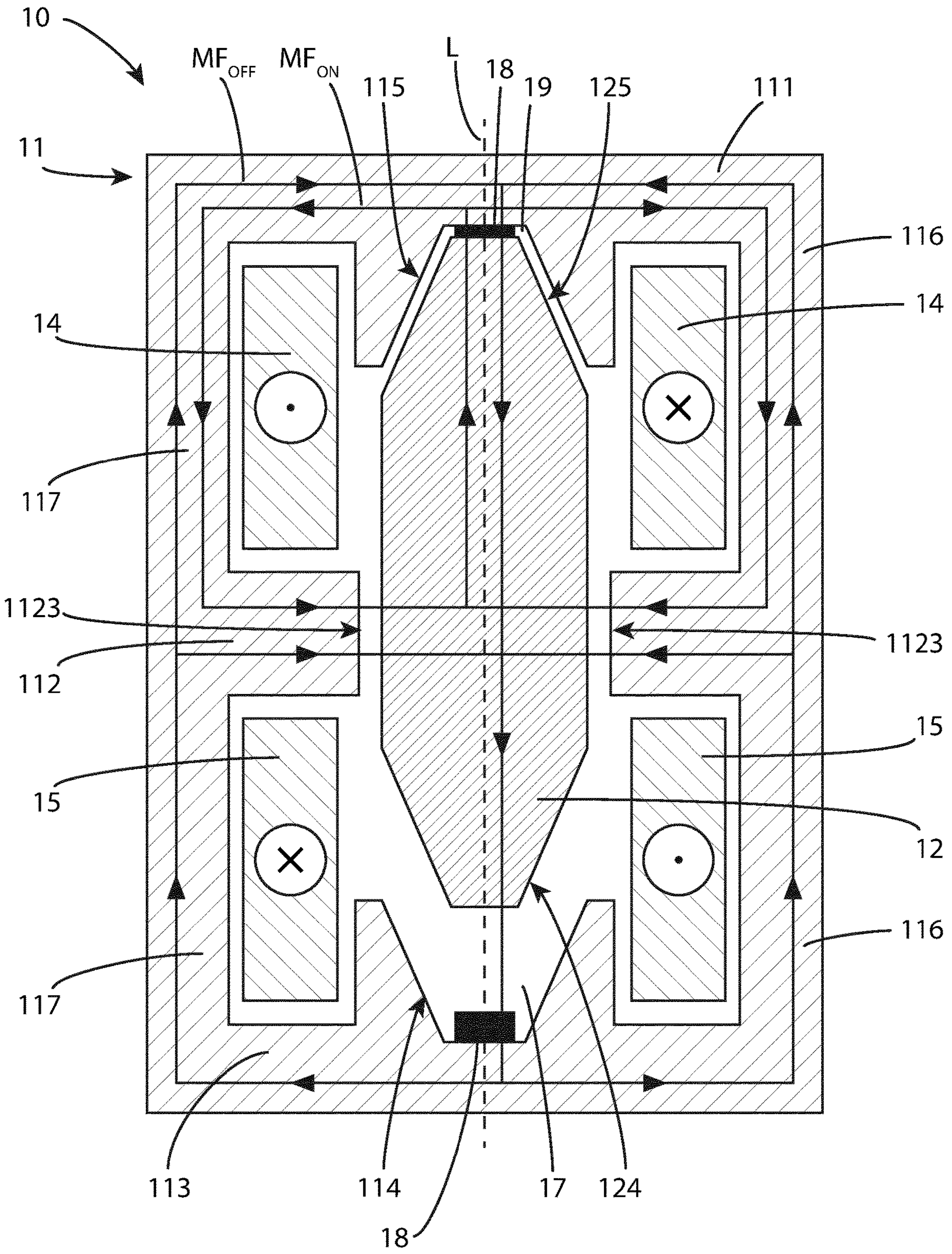
FIG. 4 shows a further example of an electromagnetic drive unit for a switching device.

When the current through the first magnetic coil 14 is stopped and the coil is no longer excited, and at the same time a current through the second magnetic coil 15 is started in an opposite direction from the direction of current flow in the first magnetic coil 14, resulting in an excitation as shown in FIG. 4, a rapid de-excitation of the holding circuit is achievable. Depending on the dimensioning of the described gap 17 a magnetic force of attraction in direction to a switched-off state is thereby obtainable. In addition, a spring force of a biased spring may constantly act on the contact bridge 23 and/or the armature 12 in direction towards the switched-off state. Thus, if there is no excitation both of the first and the second magnetic coil 14 and 15 a safe switched-off state of the switched device 1 is maintained.

Figure 3:
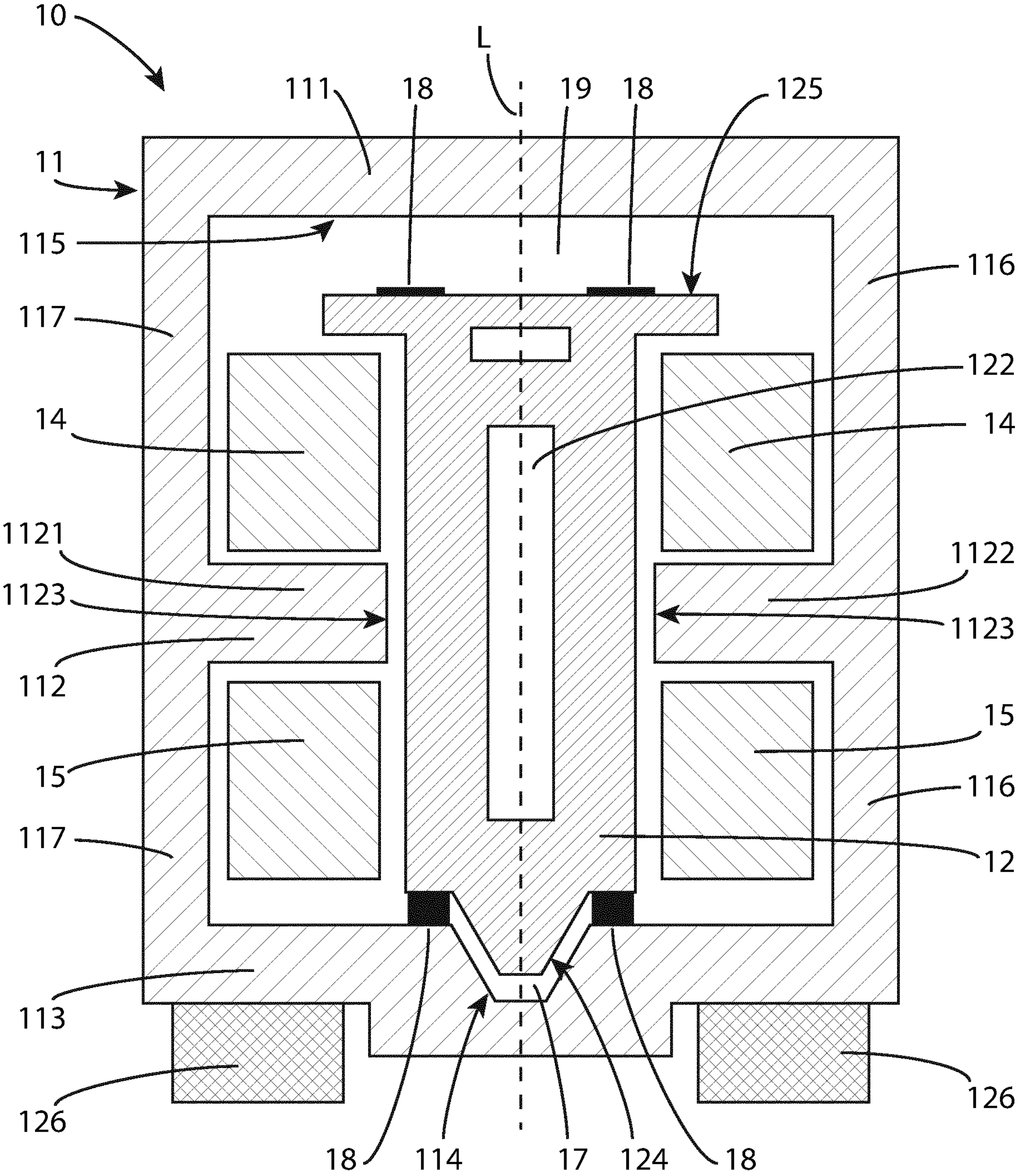
FIG. 3 shows an example of an electromagnetic drive unit for a switching device.

FIG. 3 shows a further schematic view of an embodiment of the electromagnetic drive unit 10 in a switched-off state in illustration with a further configuration of the magnetic frame structure of the magnetic core 11 and its magnetic paths 111, 112, 113. Spacers 18 are arranged at the longitudinal ends of the armature 12 to make sure that the non-magnetic gaps 19, 17 are kept at their respective distances in the first and second states, avoiding direct contact between the armature 12 and the magnetic core 11. Furthermore, the electromagnetic drive unit 10 may comprise one or more damping elements 126 to counteract vibrations due to impact of the armature 12 onto the magnetic core 11. Moreover, the armature 12 may comprise one or more recesses 122 for reasons of mass reduction resulting in a faster acceleration or speed of the armature 12 or a lower excitation needed to force a movement of the armature 12.

FIG. 4 shows a further schematic view of an embodiment of the electromagnetic drive unit 10 in a switched-on state in illustration with a further possible configuration of the magnetic frame structure of the magnetic core 11 and its magnetic paths 111, 112, 113. The armature 12 comprises inclined pole surfaces 124 and 125 at each longitudinal end, respectively. The magnetic core 11 also comprises complementary inclined magnetic surfaces 114 and 115 formed at the first magnetic path 111 and the third magnetic path 113 configured to interact with the inclined pole surfaces 124, 125 of the armature 12, respectively.

The inclined magnetic surfaces 114 and 115 of the magnetic core 11 are formed by respective protrusions extending into an inner space of the magnetic frame structure. They comprise a respective tapered contour in direction to the respective first or third magnetic path 111, 113 and a flat portion connecting the tapered portions. Different angles of the tapered portions and/or longer and shorter flat portions or even no flat portion of the interacting surfaces 114 and 124 and/or 115 and 125 are possible as well to realize aforementioned characteristics.

Spacers 18 may be used on both ends to provide for sufficient distances for non-magnetic gaps 19, 17 in the respective first and second states.

In an example embodiment, gap 17 in the second state may be larger than gap 1123 between armature 12 and the second magnetic path 112, and gap 1123 may be larger than gap 19 in the first state. Thus, spacer 18 for gap 17 may be thicker than a spacer on the lateral side around armature 12 (that is for gap 1123), which in turn may be thicker than spacer 18 for gap 19 in the first state.

In an example embodiment, spacer 18 for gap 17 may have a thickness of >0.5 mm, preferably between 0.5 and 1 mm, spacer for gap 1123 may have a thickness of 0.2-0.4 mm, and spacer 18 for gap 19 may have a thickness of less than 0.2 mm, for example between 0.05 and 0.18 mm.

Moreover, two different magnetic fluxes MFON and MFOFF are illustrated. The magnetic flux MFON relates to a holding operation mode to enable a secure and reliable holding of the first state of the armature 12 and the corresponding switched-on state of the switching device 1. The magnetic flux MFOFF relates to a switching operation mode to enable the second state of the armature 12 and the corresponding switched-off state of the switching device 1.

The holding operation mode is configured such that the magnetic flux MFON flows through the first magnetic path 111, through an portion of the magnetic strut 116 or an portion of the magnetic strut 117 between the first and the second magnetic path 112, through the respective segment 1121 or 1122 of the second magnetic path 112 and in interaction with the armature 12 through the inclined pole surface 125 and the inclined magnetic surface 115 back to the first magnetic path 111 to close a respective magnetic loop. There is no magnetic flux or at least a very low magnetic flux flowing through the third magnetic path 113 and thereby enabling a secure and reliable holding of the switched-on state by a strong holding force in conjunction with a comparatively low holding power. A magnetic field direction of the respective magnetic coil 14 is further indicated inside the depicted elements.

The switching operation mode for switching from the on-state to the off-state is configured by switching on a current in coil 15 in the indicated direction, opposite the direction of the current in coil 14, such that the magnetic flux MFOFF is generated. The magnetic flux MFOFF flows through the third magnetic path 113, and through the magnetic struts 116, 117. Here, a part of the magnetic flux branches off into the second magnetic path 112, another part flows through the magnetic struts 116, 117 into magnetic path 111, the inclined magnetic surface 115, the inclined pole surface 125 into armature 12. Here, it meets with the branched off flux through the second magnetic path 112, which enters the armature 12 through the gap 1123. The loops of the magnetic flux MFOFF are closed by gap 17 from armature 12 into the third magnetic path 113. The partition of the flux through the third magnetic path 113 into the second magnetic path 112 and the first magnetic path 111 depends on the dimensioning of the non-magnetic gap 1123 and the non-magnetic gap 19.

At the same time when the current in coil 15 is switched on, the current in coil 14 which is responsible for the magnetic flux MFON may be switched off. However, the magnetic flux MFON does not disappear immediately. By providing a current in the second magnetic coil 15 in a direction opposite of the direction of the current in the first magnetic coil 14, the magnetic flux MFOFF generated by the second magnetic coil has a direction opposite the direction of magnetic flux MFON in the first magnetic path 111. This results in a magnetic flux returning faster to 0 in the first magnetic path 111, thus reducing faster the holding force of the armature 12 in the first (switched-on) position.

Therefore, the magnetic flux MFOFF enables fast switching into the switched-off state due to a comparatively strong magnetic force acting on the armature in a direction towards the third magnetic path 113. Furthermore, the magnetic flux MFOFF contributes to an de-excitation of the flux MFON in the first magnetic path 111 generated by the first magnetic coil 14 which further beneficially affects rapid switching into the switched-off state of the switching device 1.

The magnetic fluxes MFON and MFOFF are realized by the specific magnetic frame structure of the magnetic core 11 and in particular due to its design of the magnetic paths 111, 112 and 113 in coordination with the magnetic coils 14, 15. Inter alia, the dimensioning of the gaps 17 and 1123 as well as a further gap 19 between the longitudinal end of the armature 12 facing the first magnetic path 111 allows precise configuration of a desired magnetic flux MFON and MFOFF through the magnetic core 11.

The described electromagnetic drive unit 10 enables a rapid switching-off action with a duration of potentially less than 2 ms and therefore contributes to a safe operation and avoids harm or damage in case of an overcurrent or short-circuit. In particular, the coordinated configuration of the magnetic core 11 and the magnetic coils 14, 15 enables beneficial control of the magnetic fluxes and acting magnetic forces. The geometries of the opposite pole surfaces 124 and 125 of the armature 12 for the corresponding switched-on and switched-off state of the switching device 1 further contribute to rapid switching-off and fast movement as well as reliable and stable maintenance of the respective first and second state of the armature 12.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

1 switching device
10 electromagnetic drive unit
11 magnetic core
111 first magnetic path
112 second magnetic path
1121 segment of the second magnetic path
1122 segment of the second magnetic path
1123 gap (between armature and second magnetic path)
113 third magnetic path
114 inclined magnetic surface
115 flat magnetic surface
116 magnetic strut
117 magnetic strut
12 armature
122 recess
124 inclined pole surface
125 flat pole surface
126 damping elements
14 first magnetic coil
15 second magnetic coil
17 gap (between armature and third magnetic path)
18 Spacers
19 gap (between armature and first magnetic path)
20 contact unit
21 first fixed contact
22 second fixed contact
23 contact bridge
231 first movable contact
232 second movable contact
24, 25 arc extinguishing device
26 arc guiding element

27 arc guiding device
$MF_{ON}$ magnetic flux
$MF_{OFF}$ magnetic flux

The invention claimed is:

1. An electromagnetic drive unit for a switching device, comprising:

a magnetic core with a first, a second, and a third magnetic path each arranged transversely with respect to a longitudinal axis of the electromagnetic drive unit and coupled to longitudinal magnetic struts at respective ends to form a magnetic frame structure;

an armature configured to be movable along the longitudinal axis between a first and a second state; and a first and a second magnetic coil configured to move the armature based on excitation of the first and/or the second magnetic coil, wherein the first magnetic coil is arranged between the first and the second magnetic path and the second magnetic coil is arranged between the second and the third magnetic path with respect to the longitudinal axis, wherein the first magnetic coil is configured to face a contact unit with respect to an assembled configuration of the switching device and to move the armature into the first state based on excitation, wherein the magnetic paths are configured such that the second magnetic path is arranged between the first and the third magnetic path with respect to the longitudinal axis, wherein the first magnetic path is configured to face towards the contact unit and the third magnetic path is configured to face away from the contact unit, wherein the magnetic core and the magnetic coils are configured in coordination with each other such that a magnetic flux that flows through the magnetic paths to move the armature between the first and the second state is adjustable, wherein the magnetic paths and the first magnetic coil are configured in coordination with each other such that based on excitation of the first magnetic coil the magnetic flux substantially flows through the first and the second magnetic path, and a magnetic force acts in a direction from the second magnetic path to the first magnetic path to move or hold the armature in the first state, wherein the armature at one end comprises an inclined pole surface with respect to the longitudinal axis which is configured to interact with an inclined magnetic surface of the magnetic core to set the second state of the armature, and wherein a gap having a predetermined width is defined between the inclined pole surface and the inclined magnetic surface between the armature and the magnetic core in the second state of the armature.

2. An electromagnetic drive unit for a switching device, comprising:

a magnetic core with a first, a second, and a third magnetic path each arranged transversely with respect to a longitudinal axis of the electromagnetic drive unit and coupled to longitudinal magnetic struts at respective ends to form a magnetic frame structure;

an armature configured to be movable along the longitudinal axis between a first and a second state; and a first and a second magnetic coil configured to move the armature based on excitation of the first and/or the second magnetic coil, wherein the first magnetic coil is arranged between the first and the second magnetic path and the second magnetic coil is arranged between the second and the third magnetic path with respect to the longitudinal axis, wherein the magnetic core and the magnetic coils are configured in coordination with each other such that a magnetic flux that flows through the magnetic paths to move the armature between the first and the second state is adjustable, wherein the armature at one end comprises an inclined pole surface with respect to the longitudinal axis which is configured to interact with an inclined magnetic surface of the magnetic core to set the second state of the armature, wherein a gap having a predetermined width is defined between the inclined pole surface and the inclined magnetic surface between the armature and the magnetic core in the second state of the armature, wherein the second magnetic coil is configured to face away from a contact unit with respect to an assembled configuration of the switching device and to move the armature into the second state based on excitation, wherein the magnetic paths are configured such that the second magnetic path is arranged between the first and the third magnetic path with respect to the longitudinal axis, wherein the first magnetic path is configured to face the contact unit and the third magnetic path is configured to face away from the contact unit, and wherein the magnetic paths and the magnetic coils are configured in coordination with each other such that when the first magnetic coil is de-excited and the second magnetic coil is excited, the magnetic flux flows through the magnetic paths resulting in a magnetic force that acts in a direction from the first magnetic path to the second magnetic path to move or hold the armature in the second state.

3. The electromagnetic drive unit of claim 1, wherein the first magnetic path comprises curved regions that couple the first magnetic path to the longitudinal magnetic struts.

4. An electromagnetic drive unit for a switching device, comprising:

a magnetic core with a first, a second, and a third magnetic path each arranged transversely with respect to a longitudinal axis of the electromagnetic drive unit and coupled to longitudinal magnetic struts at respective ends to form a magnetic frame structure;

an armature configured to be movable along the longitudinal axis between a first and a second state; and a first and a second magnetic coil configured to move the armature based on excitation of the first and/or the second magnetic coil, wherein the first magnetic coil is arranged between the first and the second magnetic path and the second magnetic coil is arranged between the second and the third magnetic path with respect to the longitudinal axis, wherein the magnetic core and the magnetic coils are configured in coordination with each other such that a magnetic flux that flows through the magnetic paths to move the armature between the first and the second state is adjustable, wherein the armature at one end comprises an inclined pole surface with respect to the longitudinal axis which is configured to interact with an inclined magnetic surface of the magnetic core to set the second state of the armature, wherein a gap having a predetermined width is defined between the inclined pole surface and the inclined magnetic surface between the armature and the magnetic core in the second state of the armature, wherein the armature comprises a flat pole surface at one end and the inclined pole surface at an opposite end with respect to the longitudinal axis, wherein the flat pole surface is configured to interact with a flat magnetic surface of the magnetic core to set the first state of the armature, and wherein the inclined pole surface is configured to interact with an inclined magnetic surface of the magnetic core to set the second state of the armature.

5. An electromagnetic drive unit for a switching device, comprising:

a magnetic core with a first, a second, and a third magnetic path each arranged transversely with respect to a longitudinal axis of the electromagnetic drive unit and coupled to longitudinal magnetic struts at respective ends to form a magnetic frame structure;

an armature configured to be movable along the longitudinal axis between a first and a second state; and a first and a second magnetic coil configured to move the armature based on excitation of the first and/or the second magnetic coil, wherein the first magnetic coil is arranged between the first and the second magnetic path and the second magnetic coil is arranged between the second and the third magnetic path with respect to the longitudinal axis, wherein the magnetic core and the magnetic coils are configured in coordination with each other such that a magnetic flux that flows through the magnetic paths to move the armature between the first and the second state is adjustable, wherein the armature at one end comprises an inclined pole surface with respect to the longitudinal axis which is configured to interact with an inclined magnetic surface of the magnetic core to set the second state of the armature, wherein a gap having a predetermined width is defined between the inclined pole surface and the inclined magnetic surface between the armature and the magnetic core in the second state of the armature, wherein the magnetic paths are configured such that the second magnetic path is arranged between the first and the third magnetic path with respect to the longitudinal axis and comprises two separated segments each facing the armature on opposite sides, and wherein a non-magnetic gap between a respective segment of the second magnetic path and the armature has a predetermined width.

6. The electromagnetic drive unit of claim 5, wherein the gap between the respective segment of the second magnetic path and the armature has a width larger or equal 0.2 mm.

7. The electromagnetic drive unit of claim 5, wherein a gap between the armature and the magnetic core with respect to the second state of the armature has a width larger or equal 0.5 mm.

8. The electromagnetic drive unit of claim 7, wherein the width of the gap between a respective segment of the second magnetic path and the armature is smaller than the gap between the armature and the magnetic core in the second state of the armature.

9. The electromagnetic drive unit of claim 8, wherein a width of a non-magnetic the gap between the armature and the magnetic core with respect to the first state of the armature is smaller than a width of the gap between a respective segment of the second magnetic path and the armature.

10. An electromagnetic drive unit for a switching device, comprising:

a magnetic core with a first, a second, and a third magnetic path each arranged transversely with respect to a longitudinal axis of the electromagnetic drive unit and coupled to longitudinal magnetic struts at respective ends to form a magnetic frame structure;

an armature configured to be movable along the longitudinal axis between a first and a second state; and a first and a second magnetic coil configured to move the armature based on excitation of the first and/or the second magnetic coil, wherein the first magnetic coil is arranged between the first and the second magnetic path and the second magnetic coil is arranged between the second and the third magnetic path with respect to the longitudinal axis, wherein the magnetic core and the magnetic coils are configured in coordination with each other such that a magnetic flux that flows through the magnetic paths to move the armature between the first and the second state is adjustable, wherein the armature at one end comprises an inclined pole surface with respect to the longitudinal axis which is configured to interact with an inclined magnetic surface of the magnetic core to set the second state of the armature, wherein a gap having a predetermined width is defined between the inclined pole surface and the inclined magnetic surface between the armature and the magnetic core in the second state of the armature, and wherein the magnetic core comprises a plurality of metal sheets, each sheet being electrically and magnetically isolated.

11. A switching device, comprising:

an electromagnetic drive unit, comprising:

a magnetic core with a first, a second, and a third magnetic path each arranged transversely with respect to a longitudinal axis of the electromagnetic drive unit and coupled to longitudinal magnetic struts at respective ends to form a magnetic frame structure;

an armature configured to be movable along the longitudinal axis between a first and a second state; and a first and a second magnetic coil configured to move the armature based on excitation of the first and/or the second magnetic coil, wherein the first magnetic coil is arranged between the first and the second magnetic path and the second magnetic coil is arranged between the second and the third magnetic path with respect to the longitudinal axis, wherein the magnetic core and the magnetic coils are configured in coordination with each other such that a magnetic flux that flows through the magnetic paths to move the armature between the first and the second state is adjustable, wherein the armature at one end comprises an inclined pole surface with respect to the longitudinal axis which is configured to interact with an inclined magnetic surface of the magnetic core to set the second state of the armature, and wherein a gap having a predetermined width is defined between the inclined pole surface and the inclined magnetic surface between the armature and the magnetic core in the second state of the armature; and a contact unit, comprising:

a first and a second fixed contact, a contact bridge, and a first and a second movable contact arranged at the contact bridge, wherein the first fixed contact is in contact with the first movable contact and the second fixed contact is in contact with the second movable contact in a switched-on state of the switching device, wherein the first fixed contact is free of contact with the first movable contact and the second fixed contact is free of contact with the second movable contact in a switched-off state of the switching device, and wherein the armature of the electromagnetic drive unit is coupled to the contact bridge to set the switching device in a switched-on state based on excitation of the first magnetic coil, or in a switched-off state based on de-excitation of the first magnetic coil and respective movement of the armature along the longitudinal axis.

12. The switching device of claim 11, further comprising:

a spring configured to bias the contact bridge and/or the armature in a direction to set the switching device in a switched-off state.

13. The switching device of claim 12, wherein the armature of the electromagnetic drive unit is coupled to the contact bridge to set the switching device in a switched-off state based on excitation of the second magnetic coil resulting in a magnetic force acting in a direction of the spring force of the biased spring.

14. The switching device of claim 11, further comprising:

a first arc extinguishing device comprising a first pair of arcing chambers configured to extinguish a first arc originating between the first fixed contact and the first movable contact; and a second arc extinguishing device comprising a second pair of arcing chambers configured to extinguish a second arc originating between the second fixed contact and the second movable contact.

15. The switching device of claim 11, further comprising:

a control unit having an output coupled to at least one control input of the electromagnetic drive unit, wherein the control unit is configured to set the switching device in the switched-on state or in the switched-off state depending on a control signal provided by the output of the control unit in order to control the magnetic coils and thus a movement of the armature, and wherein the control circuit is configured to set the switching device in the switched-off state.

* * * * *